United States Patent
Prabhu et al.

(10) Patent No.: US 10,459,940 B2
(45) Date of Patent: *Oct. 29, 2019

(54) SYSTEMS AND METHODS FOR INTEREST-DRIVEN DATA VISUALIZATION SYSTEMS UTILIZED IN INTEREST-DRIVEN BUSINESS INTELLIGENCE SYSTEMS

(71) Applicant: Workday, Inc., Pleasanton, CA (US)

(72) Inventors: Prithvi Prabhu, Sunnyvale, CA (US); Benjamin Mark Werther, Burlingame, CA (US); Kevin Scott Beyer, San Francisco, CA (US); John Glenn Eshleman, Mountain View, CA (US); James Mulholland, San Francisco, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,325

(22) Filed: Oct. 18, 2017

(65) Prior Publication Data
US 2018/0137180 A1 May 17, 2018

Related U.S. Application Data

(63) Continuation of application No. 13/791,028, filed on Mar. 8, 2013, now Pat. No. 9,824,127.
(Continued)

(51) Int. Cl.
*G06F 16/248* (2019.01)
(52) U.S. Cl.
CPC .................. *G06F 16/248* (2019.01)
(58) Field of Classification Search
CPC ............ G06F 16/248; G06F 17/30282; G06F 17/30563; G06F 17/30306; G06F 17/30554
See application file for complete search history.

(56) References Cited

U.S. PATENT DOCUMENTS 6,112,197 A 8/2000 Chatterjee
6,282,548 B1 * 8/2001 Burner ................. G06F 16/957
(Continued)

FOREIGN PATENT DOCUMENTS

EP 2040180 3/2009
WO WO-0042530 7/2000
(Continued)

OTHER PUBLICATIONS

Borthakur et al., 'Apache Hadoop Goes Realtime at Facebook', SIGMOD '11 Proceedings of the 2011 ACM SIGMOD International Conference on Management of data, 1071-1080.
(Continued)

*Primary Examiner* — Hasanul Mobin
(74) *Attorney, Agent, or Firm* — Van Pelt, Yi & James LLP

(57) ABSTRACT

Systems and methods for interest-driven data visualization systems in accordance with embodiments of the invention are illustrated. In one embodiment, an interest-driven data visualization system includes a processor, a memory connected configured to store an interest-driven data visualization application, and metadata storage, wherein the interest-driven data visualization application configures the processor to define reporting data requirements, generate data retrieval job data based on the reporting data requirements, transmit the data retrieval job data, receive aggregate data, create at least one piece of reporting data using the received aggregate data and the reporting data requirements, associate visualization metadata with the reporting data describing the visual appearance of the at least one piece of reporting data, and generate a report using the reporting data requirements and the visualization metadata.

18 Claims, 8 Drawing Sheets

Related U.S. Application Data

(60) Provisional application No. 61/717,092, filed on Oct. 22, 2012.

(56) References Cited

U.S. PATENT DOCUMENTS

| | | | |
|---|---|---|---|
| 6,349,138 B1 | 2/2002 | Doshi | |
| 6,842,758 B1 | 1/2005 | Bogrett | |
| 7,007,029 B1* | 2/2006 | Chen | .................... G06Q 30/00 |
| 7,143,107 B1* | 11/2006 | Nebres, Jr. | ......... G06F 16/2423 |
| | | | 707/603 |
| 7,151,438 B1 | 12/2006 | Hall | |
| 7,209,923 B1 | 4/2007 | Cooper | |
| 7,272,660 B1 | 9/2007 | Powers | |
| 7,275,053 B1 | 9/2007 | Gardner | |
| 7,293,031 B1 | 11/2007 | Dusker | |
| 7,315,849 B2 | 1/2008 | Bakalash | |
| 7,412,481 B2 | 8/2008 | Nicholls | |
| 7,430,562 B1* | 9/2008 | Bedell | ............... G06F 16/24542 |
| 7,702,615 B1 | 4/2010 | Delurgio | |
| 7,945,852 B1 | 5/2011 | Pilskalns | |
| 8,032,485 B2 | 10/2011 | Alvarez | |
| 8,068,986 B1* | 11/2011 | Shahbazi | ............. H04L 63/126 |
| | | | 342/28 |
| 8,156,101 B2 | 4/2012 | Indeck | |
| 8,165,146 B1* | 4/2012 | Melick | ................. H04B 1/7163 |
| | | | 370/390 |
| 8,217,945 B1* | 7/2012 | Moscovici | ............ G06Q 50/01 |
| | | | 345/440 |
| 8,260,840 B1 | 9/2012 | Sirota | |
| 8,261,193 B1* | 9/2012 | Alur | ..................... G06Q 10/101 |
| | | | 715/742 |
| 8,266,148 B2 | 9/2012 | Guha | |
| 8,447,721 B2 | 5/2013 | Eshleman | |
| 9,405,812 B2 | 8/2016 | Schuster | |
| 2003/0030733 A1 | 2/2003 | Seaman | |
| 2003/0229652 A1* | 12/2003 | Bakalash | ............ G06F 16/2455 |
| 2003/0236689 A1* | 12/2003 | Casati | ............. G06Q 10/06316 |
| | | | 705/7.26 |
| 2004/0059701 A1 | 3/2004 | Fedorov | |
| 2004/0138935 A1* | 7/2004 | Johnson | ........... G06Q 10/06375 |
| | | | 705/7.37 |
| 2004/0164961 A1 | 8/2004 | Bal | |
| 2005/0187974 A1 | 8/2005 | Gong | |
| 2006/0112123 A1 | 5/2006 | Clark | |
| 2007/0021992 A1 | 1/2007 | Konakalla | |
| 2007/0027904 A1 | 2/2007 | Chow | |
| 2007/0078960 A1 | 4/2007 | Dawson | |
| 2007/0136683 A1* | 6/2007 | Heidari | .................... G06F 9/451 |
| | | | 715/792 |
| 2007/0156718 A1* | 7/2007 | Hossfeld | ................ G06Q 50/20 |
| 2008/0091709 A1* | 4/2008 | Chang | .................... G06Q 10/06 |
| 2008/0109235 A1* | 5/2008 | Binnie | .................... G06Q 10/06 |
| | | | 705/7.11 |
| 2008/0201653 A1* | 8/2008 | Khandekar | ............ G06Q 40/04 |
| | | | 715/765 |
| 2008/0294996 A1 | 11/2008 | Hunt | |
| 2008/0313345 A1 | 12/2008 | Bernardin | |
| 2009/0083306 A1 | 3/2009 | Sichi | |
| 2009/0193006 A1* | 7/2009 | Herrnstadt | ............ G06F 16/221 |
| 2009/0248631 A1 | 10/2009 | Alba | |
| 2010/0100952 A1 | 4/2010 | Sample | |
| 2010/0211895 A1* | 8/2010 | Mistry | .................... G06Q 10/06 |
| | | | 715/764 |
| 2010/0251100 A1* | 9/2010 | Delacourt | ............ G06Q 30/02 |
| | | | 715/240 |
| 2010/0287135 A1* | 11/2010 | Bruland | ................ G06F 16/248 |
| | | | 707/600 |
| 2010/0287146 A1 | 11/2010 | Skelton | |
| 2010/0318451 A1 | 12/2010 | Niccolini | |
| 2011/0004830 A1 | 1/2011 | Von Kaenel | |
| 2011/0047525 A1 | 2/2011 | Castellanos | |
| 2011/0137850 A1 | 6/2011 | Mourey | |
| 2011/0145287 A1 | 6/2011 | Jiang | |
| 2011/0282690 A1 | 11/2011 | Patel | |
| 2011/0313969 A1 | 12/2011 | Ramu | |
| 2011/0314403 A1* | 12/2011 | Yan | .................... G06Q 10/0639 |
| | | | 715/772 |
| 2012/0130987 A1* | 5/2012 | Bose | ................. G06F 16/24556 |
| | | | 707/718 |
| 2012/0169713 A1* | 7/2012 | Gao | ................... G06Q 10/0637 |
| | | | 345/419 |
| 2012/0179742 A1 | 7/2012 | Acharya | |
| 2012/0239609 A1 | 9/2012 | Zhao | |
| 2013/0013552 A1 | 1/2013 | Eshleman | |
| 2013/0018671 A1 | 1/2013 | Hussam | |
| 2013/0086104 A1 | 4/2013 | Morrison | |
| 2013/0103677 A1 | 4/2013 | Chakra | |
| 2013/0136416 A1 | 5/2013 | Sathish | |
| 2013/0226860 A1 | 8/2013 | Eshleman | |
| 2013/0238551 A1 | 9/2013 | Eshleman | |
| 2014/0114909 A1 | 4/2014 | Schuster | |
| 2014/0114970 A1 | 4/2014 | Prabu | |
| 2014/0258209 A1 | 9/2014 | Eshleman | |
| 2015/0081353 A1 | 3/2015 | Schuster | |
| 2015/0081618 A1 | 3/2015 | Schuster | |
| 2015/0081619 A1 | 3/2015 | Brown | |
| 2015/0112969 A1 | 4/2015 | Prabhu | |
| 2016/0162521 A1 | 6/2016 | Pradhan | |

FOREIGN PATENT DOCUMENTS

| | | |
|---|---|---|
| WO | WO-2007072501 | 6/2007 |
| WO | WO-2008092149 | 7/2008 |
| WO | WO-2013130870 | 9/2013 |
| WO | WO-2014066051 | 5/2014 |
| WO | WO-2014066052 | 5/2014 |
| WO | WO-2014137413 | 9/2014 |
| WO | WO-2015041714 | 3/2015 |
| WO | WO-2015041731 | 3/2015 |
| WO | WO-2015041735 | 3/2015 |
| WO | WO-2015060892 | 4/2015 |
| WO | WO-2015060893 | 4/2015 |

OTHER PUBLICATIONS

Cohen, Jeffrey et al., 'MAD Skills: New Analysis Practices for Big Data', Proceedings of the VLDB Endowment, vol. 2 Issue 2, Aug. 2009, 1481-1492.

Condie, Tyson et al., 'MapReduce Online', Nsdi. vol. 10. No. 4. 2010. Available online at http://www.eecs.berkeley.edu/Pubs/TechRpts/2009/EECS-2009-136.html, 1-15.

Extended European Search Report for European Application EP13754225.4,Report Completed May 4, 2015, dated May 13, 2015, 4 Pgs.

International Preliminary Report on Patentability for International Application PCT/US2013/028402, report completed Apr. 23, 2013, dated Sep. 12, 2014, 6 Pgs., Sep. 12, 2014.

International Preliminary Report on Patentability for International Application PCT/US2013/064271, Report Issued Apr. 28, 2015, dated May 7, 2015, 9 Pgs.

International Preliminary Report on Patentability for International Application PCT/US2013/064272, Report Issued Apr. 28, 2015, dated May 7, 2015, 5 Pgs.

International Preliminary Report on Patentability for International Application PCT/US2013/067815, Report Issued Sep. 8, 2015, dated Sep. 17, 2015, 9 Pgs.

International Preliminary Report on Patentability for International Application PCT/US2014/022060, Report issued Mar. 22, 2016, dated Mar. 31, 2016, 8 Pgs.

International Preliminary Report on Patentability for International Application PCT/US2014/029149, Report issued Apr. 26, 2016, dated May 6, 2016, 9 Pgs.

International Preliminary Report on Patentability for International Application PCT/US2014/029191, Report issued Apr. 26, 2016, dated May 6, 2016, 9 Pgs.

International Preliminary Report on Patentability for International Application PCT/US2014/042488, Report issued Mar. 22, 2016, dated Mar. 31, 2016, 8 Pgs.

(56) References Cited

OTHER PUBLICATIONS

International Preliminary Report on Patentability for International Application PCT/US2014/044050, Report issued Mar. 22, 2016, dated Mar. 31, 2016, 6 Pgs.
International Search Report and Written Opinion for International Application PCT/US13/64271, report completed Mar. 26, 2014, dated Apr. 18, 2014, 10 Pgs.
International Search Report and Written Opinion for International Application PCT/US13/64272, report completed Mar. 28, 2014, dated Apr. 21, 2014, 6 Pgs.
International Search Report and Written Opinion for International Application PCT/US14/22060, report completed Jun. 23, 2014 dated Jul. 21, 2014, 9 Pgs.
International Search Report and Written Opinion for International Application PCT/US14/29149, report completed Jul. 22, 2014, dated Aug. 25, 2014, 9 Pages.
International Search Report and Written Opinion for International Application PCT/US14/29191, report completed Jun. 30, 2014, dated Aug. 15, 2014, 9 Pages.
International Search Report and Written Opinion for International Application PCT/US14/42488, report completed Sep. 25, 2014, dated Oct. 30, 2014, 9 Pgs., Oct. 30, 2014.
International Search Report and Written Opinion for International Application PCT/US14/44050, report completed Oct. 3, 2014, dated Oct. 15, 2014, 7 Pgs., Oct. 15, 2014.
International Search Report and Written Opinion for International Application PCT/US2013/028402, completed Apr. 22, 2013, 7 pgs.
International Search Report and Written Opinion for International Application PCT/US2013/067815, completed Apr. 14, 2014, 11 pgs.
International Search Report and Written Opinion for International Application PCT/US2014/027875, report completed Jul. 15, 2014, dated Aug. 19, 2014, 9 Pages.
Karabegovic, Almir et al., 'Geoportal as Decision Support System with Spatial Data Warehouse', [online] published 2012. [retrieved on Oct. 3, 2014 (Mar. 10, 2014)] Retrieved from the Internet<URL: https://fedcsis.org/proceedings/2012/pliks/111.pdf> entire document, 2012, 4 Pages.
Kossmann, Donald , 'The State of the Art in Distributed Query Processing', ACM Computing Surveys, vol. 32 Issue 4, Dec. 2000, Dec. 2000, 422-469.
Metwally, Ahmed et al., "Efficient computation of frequent and top-k elements in data streams." International Conference on Database Theory. Springer, Berlin, Heidelberg, 2005.
Morfonios, Konstantinos et al., 'ROLAP Implementations of the Data Cube', ACM Computing Surveys, vol. 39, No. 4, Article 12, 2007, Oct. 2007, 12:1-12:53.
Nandi, Arnab et al., 'Guided Interaction: Rethinking the Query-Result Paradigm', Proceedings of the VLDB Endowment, vol. 4, No. 12, Aug. 2011, 1466-1469.
Shvachko et al., 'The Hadoop Distributed File System', 2010 IEEE 26th Symposium on Mass Storage Systems and Technologies (MSST), 1-10.

* cited by examiner

SYSTEMS AND METHODS FOR INTEREST-DRIVEN DATA VISUALIZATION SYSTEMS UTILIZED IN INTEREST-DRIVEN BUSINESS INTELLIGENCE SYSTEMS

CROSS-REFERENCE TO RELATED APPLICATIONS

This application is a continuation of co-pending U.S. patent application Ser. No. 13/791,028, entitled SYSTEMS AND METHODS FOR INTEREST-DRIVEN DATA VISUALIZATION SYSTEMS UTILIZED IN INTEREST-DRIVEN BUSINESS INTELLIGENCE SYSTEMS filed Mar. 8, 2013 which is incorporated herein by reference for all purposes, which claims priority to U.S. Provisional Application No. 61/717,092, entitled SYSTEMS AND METHODS FOR INTEREST-DRIVEN DATA VISUALIZATION SYSTEMS UTILIZED IN INTEREST-DRIVEN BUSINESS INTELLIGENCE SYSTEMS filed Oct. 22, 2012 which is incorporated herein by reference for all purposes.

FIELD OF THE INVENTION

The present invention relates to data visualization systems, and more specifically to interest-driven data visualization systems utilized in interest-driven business intelligence systems.

BACKGROUND OF THE INVENTION

The term "business intelligence" is commonly used to refer to techniques for identifying, processing, and analyzing business data. Business intelligence systems can provide historical, current, and predictive views of business operations. Business data, generated during the course of business operations, including data generated from business processes and the additional data created by employees and customers, may be structured, semi-structured, or unstructured depending on the context and knowledge surrounding the data. In many cases, data generated from business processes is structured, whereas data generated from customer interactions with the business is semi-structured or unstructured. Due to the amount of data generally generated during the course of business operations, business intelligence systems are commonly built on top of and utilize a data warehouse.

Data warehouses are utilized to store, analyze, and report data; for example, business data. Data warehouses utilize databases to store, analyze, and harness the data in a productive and cost-effective manner. A variety of databases are commonly utilized including a relational database management system (RDBMS), such as the Oracle Database from the Oracle Corporation of Santa Clara, Calif., or a massively parallel processing analytical database, such as Teradata from the Teradata Corporation of Miamisburg, Ohio. Business intelligence (BI) and analytical tools, such as SAS from SAS Institute, Inc. of Cary, N.C., are used to access the data stored in the database and provide an interface for developers to generate reports, manage and mine the stored data, perform statistical analysis, business planning, forecasting, and other business functions. Most reports created using BI tools are created by database administrators, and the underlying database may be tuned for the expected access patterns. A database administrator may index, pre-aggregate or restrict access to specific relations, allow ad-hoc reporting and exploration.

A snowflake schema is an arrangement of tables in a RDBMS, with a central fact table connected to one or more dimension tables. The dimension tables in a snowflake schema are normalized into multiple related tables—for a complex schema there will be many relationships between the dimension tables, resulting in a schema which looks like a snowflake. A star schema is a specific form of a snowflake schema having a fact table referencing one or more dimension tables. However, in a star schema, the dimensions are normalized into a single table—the fact table is the center and the dimension tables are the "points" of the star.

Online transaction processing (OLTP) systems are designed to facilitate and manage transaction-based applications. OTLP may refer to a variety of transactions such a database management system transactions, business, or commercial transactions. OLTP systems typically have low latency response to user requests.

Online analytical processing (OLAP), a modification of OLTP, is an approach to answering multidimensional analytical queries. OLAP tools enable users to analyze multidimensional data utilizing three basic analytical operations: consolidation (aggregating data), drill-down (navigating details of data), and slice and dice (take specific sets of data and view from multiple viewpoints). The basis for any OLAP system is an OLAP cube. An OLAP cube is a data structure allowing for fast analysis of data with the capability of manipulating and analyzing data from multiple perspectives. OLAP cubes typically are composed of numeric facts, called measures, categorized by dimensions. These facts and measures are commonly created from a star schema or a snowflake schema of tables in a RDBMS.

SUMMARY OF THE INVENTION

Systems and methods for providing metrics information to an interest-driven data visualization system in accordance with embodiments of the invention are illustrated.

DETAILED DISCLOSURE OF THE INVENTION

Figure 1:
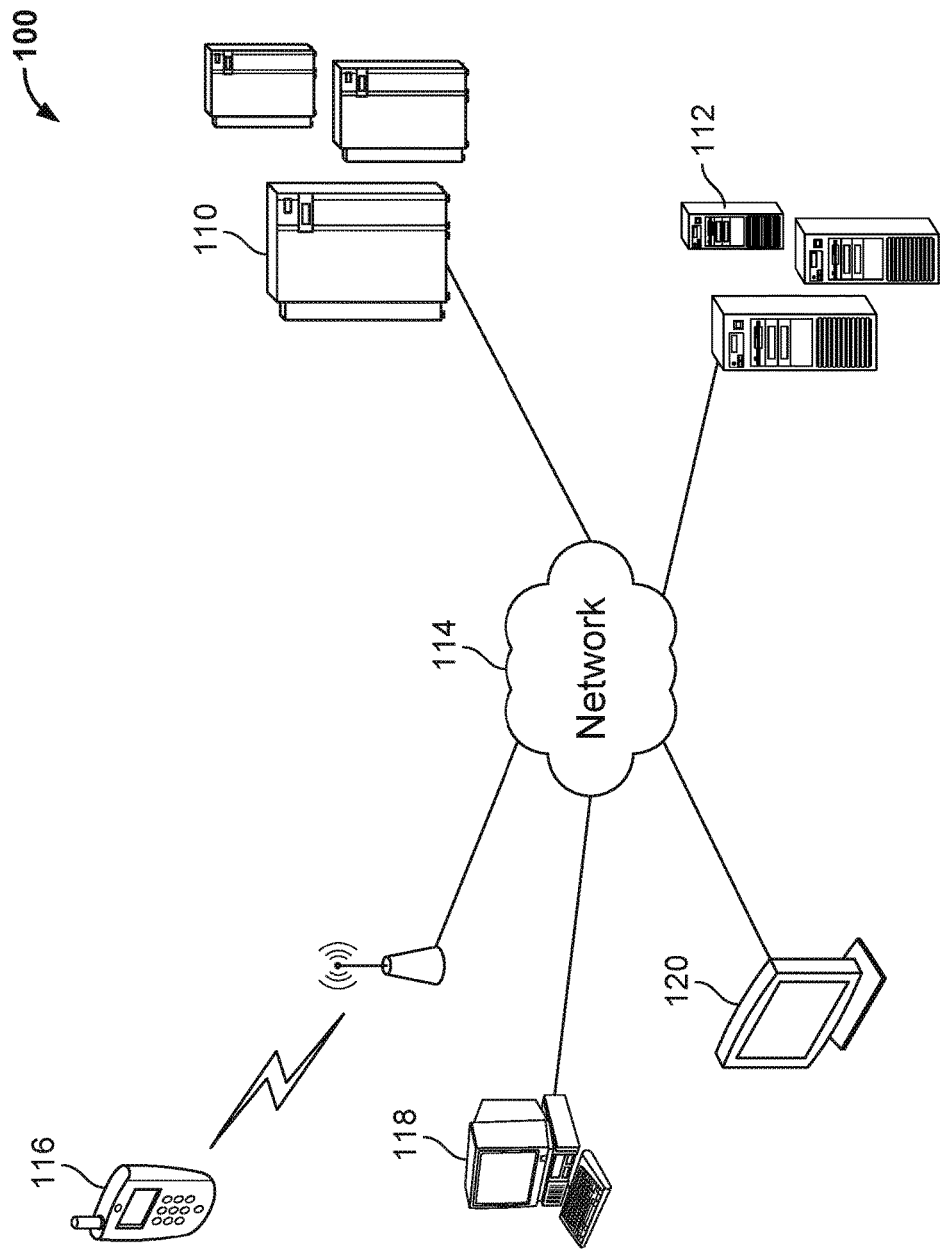
FIG. 1 is a network diagram of a business intelligence system including interest-driven data visualization systems in accordance with an embodiment of the invention.

Turning now to the drawings, interest-driven data visualization systems that provide metrics information about an interest-driven data pipeline in accordance with embodiments of the invention are illustrated. Interest-driven data visualization systems enable analysts using a variety of systems, including, but not limited to, interest-driven business intelligence systems, to rapidly generate reports using data retrieved and held in-memory by interest-driven business intelligence systems and, at the same time, have the ability to drill down into the underlying raw data to dynamically create new reports. Interest-driven business intelligence systems are business intelligence systems configured to dynamically build an interest-driven data pipeline to provide an analyst with information of interest. Interest-driven business intelligence systems are capable of managing huge datasets in a way that provides an analyst with complete visibility into the available data and the ability to dynamically reconfigure the interest-driven business intelligence system to provide access to desired information. In order to achieve highly interactive performance, an interest-driven business intelligence system dynamically builds an interest-driven data pipeline to load data of interest into system memory based on the desired consumption of the data. Changes specified at the report level can be automatically compiled and traced backward by the interest-driven business intelligence system to create an appropriate interest-driven data pipeline to meet the new report requirements. Interest-driven business intelligence systems further build metadata concerning the data available in the interest-driven business intelligence system and provide the metadata to interest-driven data visualization systems to enable the construction of reports using the metadata. Available data in an interest-driven business intelligence system includes, but is not limited to, raw data, aggregate data, filtered data, and reporting data. The available data in an interest-driven business intelligence system can depend on the amount of processing time required to create the data; as such, the available data can be associated with data access time metadata indicating an estimation of the time required to produce the available data. Systems and methods for interest-driven business intelligence systems are disclosed in U.S. patent application Ser. No. 13/408,872 to Eshleman et al., titled "Interest-Driven Business Intelligence Systems and Methods of Data Analysis Using Interest-Driven Data Pipelines" and filed Feb. 29, 2012, the entirety of which is incorporated by reference. Furthermore, a user may wish to know metrics about the interest-driven data pipeline in order to generate report requests that include as much desired data as possible given constraints based upon the size of the various sets of data and/or time needed to create the data. Thus, the visualization system may provide this information to a user to aid the user in creating a request for a report in some embodiments of this invention.

New reports and visualizations of those reports can utilize reporting data already provided by the interest-driven business intelligence system and/or cause new reporting data to be generated by the interest-driven business intelligence system to populate the report. Reporting data provided by interest-driven business intelligence systems includes raw data loaded from raw data storage in the business intelligence system that has been processed and loaded into a data structure to provide rapid access to the data. Raw data includes, but is not limited to, structured data, semi-structured data, and unstructured data and can be stored in one or more data sources associated with the interest-driven business intelligence system. In a variety of embodiments, structured and semi-structured data includes metadata, such as an index or other relationships, describing the data; unstructured data lacks any definitional structure. In several embodiments the processing of raw data includes, but is not limited to, aggregating the raw data and filtering the raw data. Business intelligence systems load raw data into a variety of data structures in accordance with a number of embodiments, including, but not limited to, online analytical processing (OLAP) cubes. In many embodiments, visualizations are the viewable representations of reporting data present in an interest-driven data visualization system.

Visualizations can take many forms, such as pie charts, bar charts, tables, or any other form, which enables the viewing of data contained in the report. In a variety of embodiments, visualizations are multi-dimensional and allow for multiple simultaneous displays, such as via layering and/or compositing different visualizations for different pieces of reporting data, using the reporting data associated with the visualization. The visualization itself is independent of the reporting data it operates on, allowing the analysis to be created on the fly for different pieces of reporting data. Rendering of visualizations is accomplished by associating the pieces of reporting data with graphical primitives and combining the graphical primitives to form a composite rendering of the visualization. The composite rendering takes into account the nature and attributes of the pieces of reporting data, enabling pieces of reporting data from disparate sources to be interpreted correctly by analyzing the visualization. The reports and/or the visualizations are configured to be displayed using display devices in several embodiments of the invention.

In many embodiments of the invention, reports utilized in interest-driven data visualization systems include a set of datasets determined using reporting data received from an interest-driven business intelligence system and a set of visualizations. Interest-driven data visualization systems are configured to enable the dynamic association of datasets to visualizations to provide a variety of interactive reports describing the data. A variety of aspects of the visualization, including the color, style, size, and dimensions of the visualization may be mapped to facts contained in the datasets to generate reports. Additionally, the aspects of the visualization may be dynamically updated in real time. Interest-driven data visualization systems provide access to metadata describing the raw data available from an interest-driven business intelligence system and use that metadata to enable requests for new and updated reporting data for use in reports. Metadata storage, including memory included in the interest-driven data visualization system and/or a separate device providing the metadata, is utilized in a variety of embodiments to store the metadata describing the raw data available from the interest-driven business intelligence system. In cases where the interest-driven business intelligence system is unable to immediately provide the requested reporting data, such as in cases where the interest-driven business intelligence system retrieves and process raw data to generate the requested reporting data, interest-driven data visualization systems are configured to provide an indication of the time remaining until the requested reporting data is available. In several embodiments, interest-driven data visualization systems are configured to incrementally update reports based upon requested reporting data being provided by an interest-driven business intelligence system.

Systems and methods for interest-driven data visualization systems in accordance with embodiments of the invention are discussed further below.

System Overview

An interest-driven business intelligence system in accordance with an embodiment of the invention is illustrated in FIG. 1. The interest-driven business intelligence system 100 includes a distributed computing platform 110 configured to store raw business data. The distributed computing platform 110 is configured to communicate with an intermediate processing system 112 via a network 114. In several embodiments of the invention, the network 114 is a local area network. In many embodiments, the distributed computing platform 110 communicates with the intermediate processing system 112 via the Internet 114. In many embodiments of the invention, the distributed computing platform 110 is a cluster of computers configured as a distributed computing platform. The distributed computing platform 110 can be configured to act as a raw data storage system and a data warehouse within the interest-driven business intelligence system. In a variety of embodiments, alternative distributed processing systems are utilized.

In several embodiments, the intermediate processing system 112 is also implemented using one or a cluster of computing devices. Based upon the visualizations specified by the analysts, the intermediate processing system 112 automatically creates and/or updates one or more interest-driven data pipelines to create or update reporting data. The interest-driven data pipeline is typically configured by pushing down data retrieval jobs to the distributed computing platform 110 to create source data and then applying various filter and/or aggregation processes to the source data using the intermediate processing system 112 to produce reporting data that is stored in-memory to improve the response time for producing the reporting data. In a number of embodiments, data retrieval job data is used to represent and transmit a data retrieval job. In several embodiments, when the reporting data is not stored in-memory, the intermediate processing system 112 is configured to generate the reporting data using raw data stored in the distributed computing platform 110. The intermediate processing system 112 is also configured to communicate via network 114 with one or more interest-driven data visualization systems, including, but not limited to, cellular telephones 116, personal computers 118, and presentation devices 120. In many embodiments of the invention, interest-driven data visualization systems include any computing device capable of receiving and/or displaying data. In several embodiments of the invention, the interest-driven data visualization systems are configured to communicate with the intermediate processing system 112. In a number of embodiments, the interest-driven data visualization systems are configured to communicate with the distributed computing platform 110.

Interest-driven data visualization systems in accordance with embodiments of the invention enable analysts to specify reports including data visualizations that enable the analyst to explore the raw data stored within the distributed computing platform 110 using reporting data generated by the intermediate processing system 112. Reporting data is provided in a variety of forms, including, but not limited to, snowflake schemas and star schemas. In many embodiments, reporting data is any data that includes fields of data populated using raw data stored within the distributed computing platform 110. Interest-driven data visualization systems are configured to create reports having one or more of a variety of visualizations; visualizations have one or more visualization characteristics. Interest-driven data visualization systems are further configured to generate datasets using the reporting data and to receive input and use that input to map fields of data in the datasets to one or more visualization characteristics. Interest-driven data visualization systems may receive input in a variety of manners in accordance with embodiments of the invention, including, but not limited to, a web-based interface, a native application, a machine-performed script, and via application programming interface calls.

Interest-driven data visualization devices also provide metadata describing a listing of raw data stored within the distributed computing platform 110; the raw data described in the metadata may or may not be included in the reporting data provided by the intermediate processing system 112. Interest-driven data visualization systems are configured to enable the exploration of the raw data stored within the distributed computing platform 110 by creating a data catalog using the metadata provided by the distributed computing platform 110 and/or the reporting data provided by the intermediate processing system 112. When additional reporting data is requested for use in a report, the interest-driven data visualization system creates and transmits a request to the intermediate processing layer 112, causing the intermediate processing layer 112 to dynamically update one or more interest-driven data pipelines to create new and/or updated reporting data containing the requested additional reporting data using raw data received from the distributed computing platform 110.

Although a specific architecture for an interest-driven business intelligence system in accordance with an embodiment of the invention is conceptually illustrated in FIG. 1, any of a variety of architectures configured to store large data sets and to automatically build interest-driven data pipelines based upon reports built using interest-driven data visualization systems can also be utilized. Systems and methods for interest-driven data visualization systems in accordance with embodiments of the invention are discussed further below

Interest-Driven Data Visualization Systems

Interest-driven data visualization systems are configured to create reports using datasets determined using reporting data provided by interest-driven business intelligence systems by mapping fields of data to visualization characteristics in the reports. Interest-driven data visualization systems are further configured to enable the exploration of metadata describing raw data and request additional reporting data based upon the raw data in order to support new and updated reports. An interest-driven data visualization system in accordance with an embodiment of the invention is conceptually illustrated in FIG. 2. The Interest-driven data visualization system 200 includes a processor 210 in communication with volatile memory 220 and non-volatile memory 230. The interest-driven data visualization system 200 also includes a network interface 240 configured to send and receive data over a network connection. In a number of embodiments, the network interface 240 is in communication with the processor 210, the non-volatile memory 230, and the volatile memory 220.

In several embodiments, non-volatile memory is any form of non-volatile storage configured to store a variety of data, including, but not limited to, reporting data 234. In the illustrated embodiment, the non-volatile memory 230 is also configured to store a data visualization application 232 that configures the processor 210 to perform an interest-driven data visualization process including, but not limited to, exploring reporting data having one or more fields of data, defining visualizations by mapping the fields of data to visualizations, and creating a variety of reports using the defined visualizations. In many embodiments, the data visualization application 232 and/or reporting data 234 are stored using an external server system and received by the interest-driven data visualization system 200 using a network interface 240. External server systems in accordance with a variety of embodiments include, but are not limited to, interest-driven business intelligence systems, distributed computing platforms, and intermediate processing systems. In many embodiments, the data visualization application 232 configured the processor 210 to generate requests for additional reporting data. In several embodiments, the processor 210 is configured to transmit the requests using the network interface 240.

Figure 2:
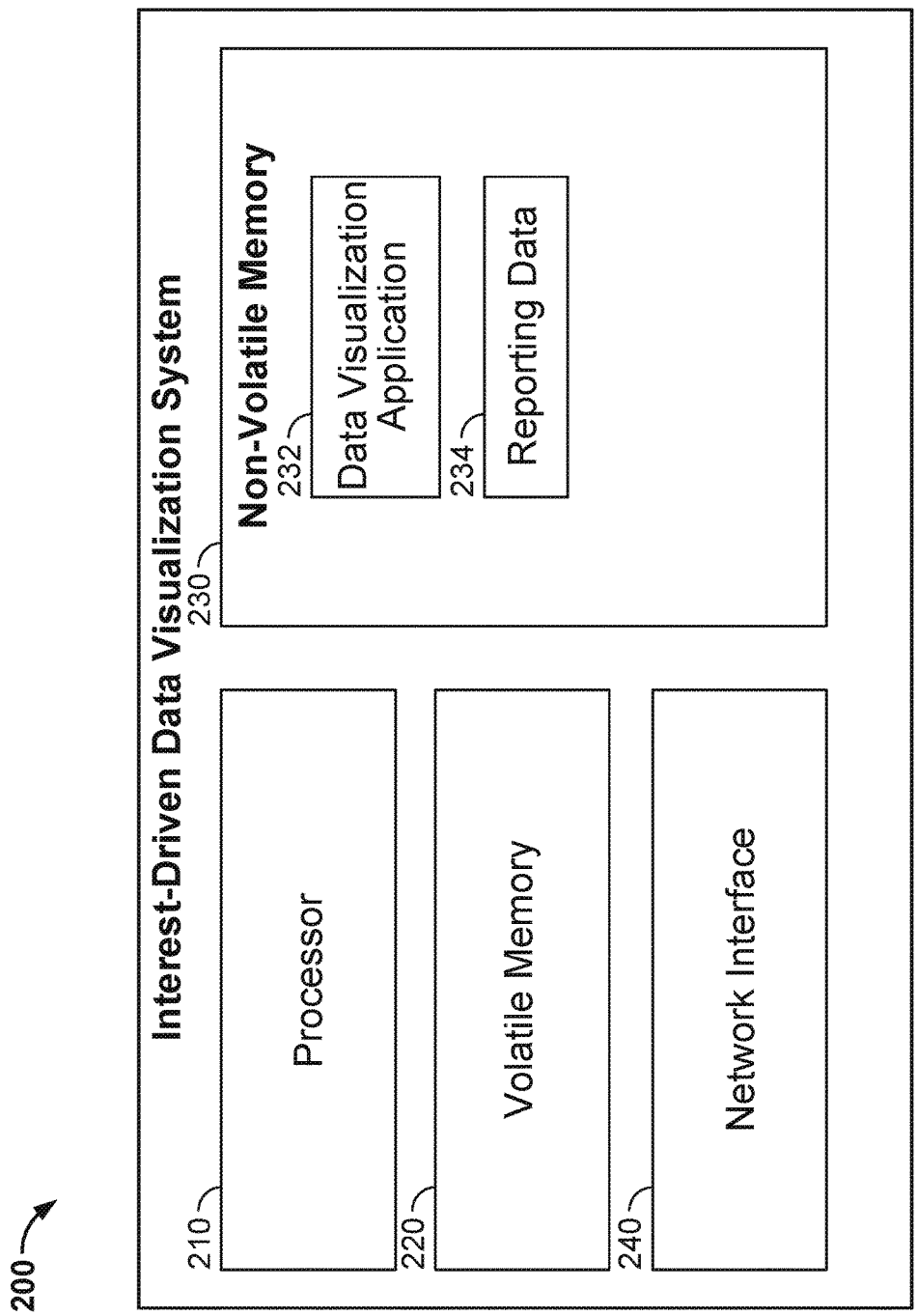
FIG. 2 is a conceptual illustration of an interest-driven data visualization system in accordance with an embodiment of the invention.

Although a specific architecture for an interest-driven data visualization system in accordance with an embodiment of the invention is conceptually illustrated in FIG. 2, any of a variety of architectures, including those which store data or applications on disk or some other form of storage and are loaded into volatile memory 220 at runtime, can also be utilized. Methods for interest-driven data visualization in accordance with embodiments of the invention are discussed further below.

Interest-Driven Data Visualization

Figure 4:
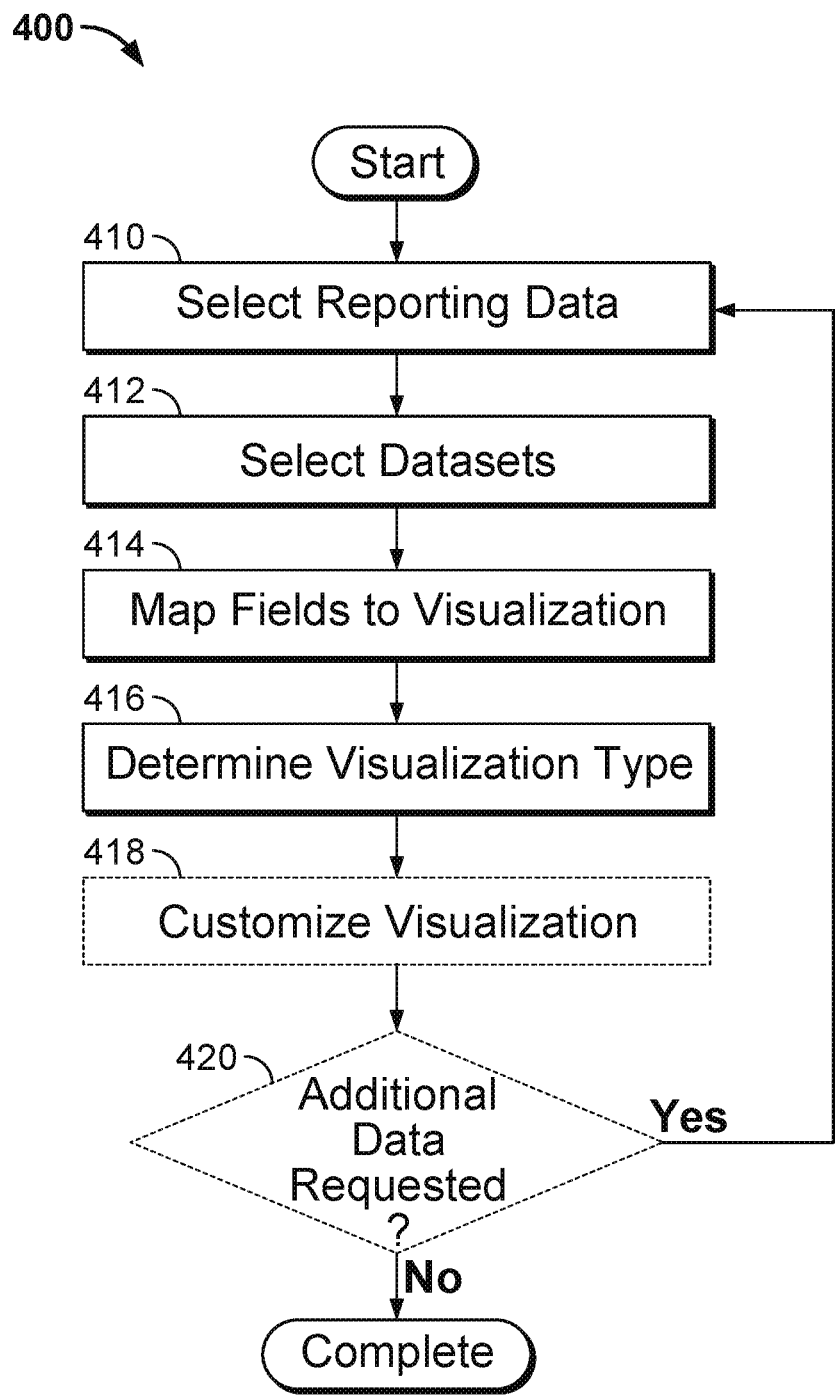
FIG. 4 is a flow chart illustrating a process for the interest-driven visualization of data in accordance with an embodiment of the invention.

Reports are the primary method for analysts to visualize, explore, and present data stored in interest-driven business intelligence systems. Interest-driven data visualizations systems are configured to enable generation of and interaction with reports. Reports generated using interest-driven data visualization systems can also define and cause updates to interest-driven data pipelines. A process for interest-driven data visualization in accordance with an embodiment of the invention is illustrated in FIG. 4. The process 400 includes selecting (410) reporting data. Datasets are selected (412). Data fields in the datasets are mapped (414) to a visualization. The visual appearance of the visualization is determined (416). In a number of embodiments, the visualization is customized (418). If additional reporting data is requested (420), additional reporting data is selected (410). If additional reporting data is not requested (420), the process completes.

In a variety of embodiments, the selected (410) reporting data is received from an interest-driven business intelligence system. The reporting data includes one or more datasets. In a number of embodiments, selecting (412) datasets includes selecting datasets present in the selected (410) reporting data. In many embodiments, selecting (412) datasets includes selecting datasets in reporting data that is retrieved from an interest-driven business intelligence system. In many embodiments, reporting data requirements include the selected (412) datasets. In several embodiments, reporting data requirements further include references to one or more data sources from which the selected (412) datasets can be retrieved. Datasets include one or more data fields. In several embodiments, mapping (414) data fields to a visualization includes associating data fields with visualization characteristics defined in the visualization. In many embodiments, mapping (414) data fields to a visualization is performed utilizing a generic mapping and/or a mapping based on a mapping template. In a variety of embodiments, a generic mapping and/or a mapping template can be used to map (414) data fields to a visualization using reporting data metadata describing the specific data stored in the data fields and matching the description of the data fields to specific properties of the visualization. In this way, mapping (414) data fields to a visualization allows generalized visualizations to be applied to a variety of reporting data. In several embodiments, the mapping (414) of data fields to the visualization is performed automatically based on the selected (412) datasets and/or the selected (410) reporting data.

Many types of visualizations can be created using interest-driven data systems, including, but not limited to, bar graphs, pie charts, line graphs, point graphs, and heat maps. Visualizations may be two dimensional, three dimensional, or n-dimensional depending on the type of visualization and the mapped (414) fields. In a number of embodiments, the type of visualization is determined (416) dynamically based upon the mapped (414) data fields. In a variety of embodiments, a plurality of visualizations are determined (416) dynamically based upon the mapped (414) data fields. In several embodiments, the type of visualization is determined (416) manually. In many of embodiments, customizing (418) a visualization includes changing the width, height, colors, scale, and geometry of the visualization. A number of properties that can be customized (418) in a visualization not specifically listed above can be utilized according to the requirements of a specific application in accordance with a variety of embodiments of the invention.

In several embodiments, requesting (420) additional reporting data includes selecting (410) additional reporting data present in the interest-driven data visualization system. In many embodiments, requesting (420) additional reporting data includes receiving additional reporting data from an interest-driven business intelligence system. In a variety of embodiments, requesting (420) additional reporting data includes receiving incremental reporting data updates from an interest-driven business intelligence system, where the interest-driven business intelligence system configures an interest-driven data pipeline to generate one or more pieces of incremental reporting data using aggregate data generated utilizing unstructured raw data. The raw data can be stored in a variety of systems, including a distributed data storage system. Systems and methods for generating reporting data using a distributed data storage system that can be utilized in accordance with embodiments of the invention are disclosed in U.S. patent application Ser. No. 13/790,624, titled "Systems and Methods for Interest-Driven Distributed Data Server Systems" and filed Mar. 8, 2013, the entirety of which is hereby incorporated by reference. Additional processes for requesting (420) additional reporting data in accordance with a number of embodiments are described below with respect to FIG. 7.

Figure 3:
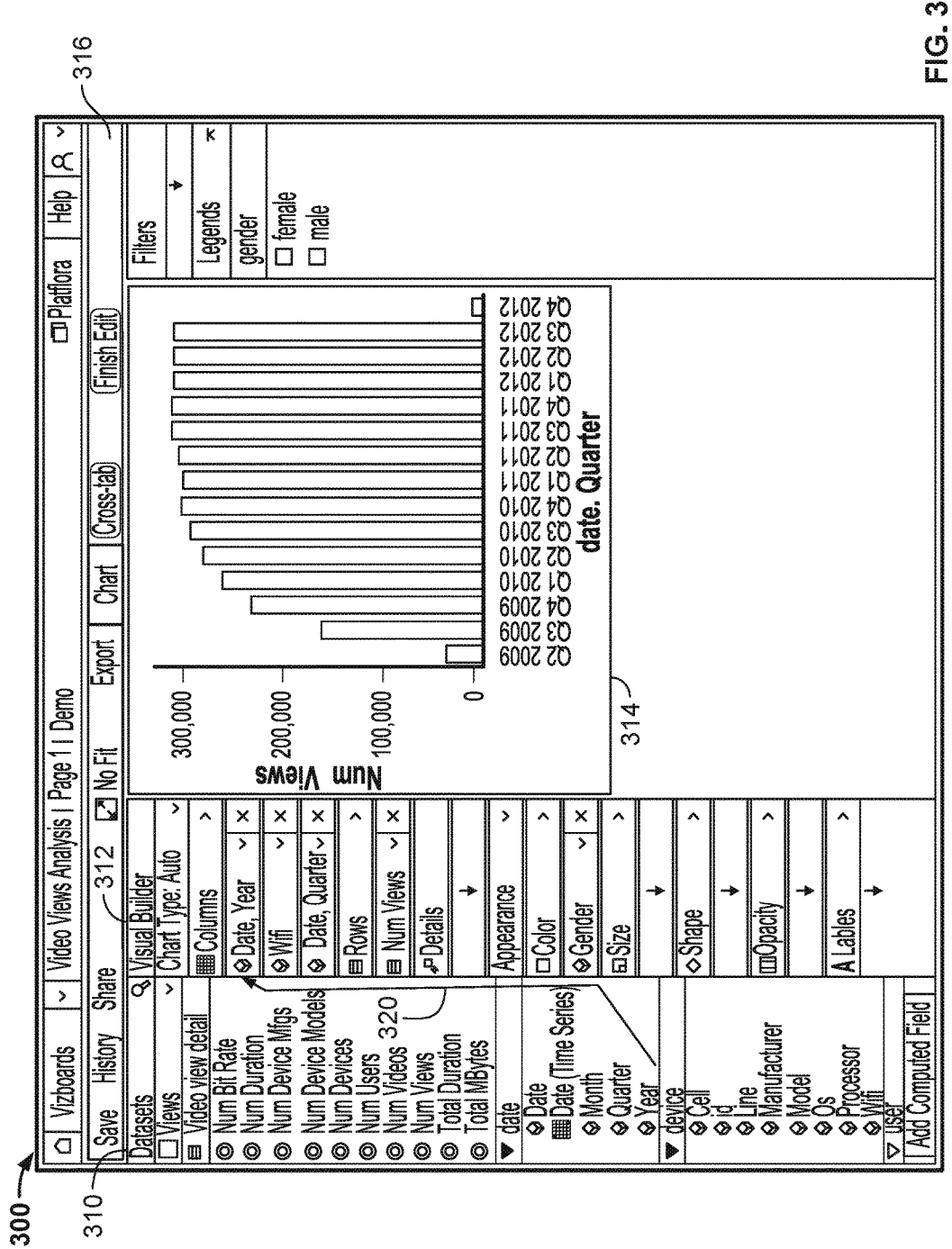
FIG. 3 is an illustration of the visual appearance of an interest-driven data visualization system in accordance with an embodiment of the invention.

Turning now to FIG. 3, an example user interface utilized in interest-driven data visualization systems to perform interest-driven data visualization in accordance with an embodiment of the invention is illustrated. The user interface 300 includes a plurality of datasets 310, a set of visualization characteristics 312, a rendered visualization 314, and a set of filters 316. Datasets 310 typically indicate a number of data fields present in the datasets selected from one or more pieces of reporting data and/or metadata received from an interest-driven business intelligence system. The set of visualization characteristics 312 includes a listing of all the visualization characteristics for the rendered visualization 314, along with an indication of which data fields have been mapped to which visualization characteristics. One mapping present between datasets 310 and the visualization characteristics 320 is mapping 320 of data field 'date.Year' to visualization characteristic 'Columns.' A number of mappings not specifically illustrated can be utilized according to the requirements of a variety of embodiments of the invention. The rendered visualization 314 is the visualized representation of the mappings and may be updated and modified by adjusting the visualization characteristics 312. The set of filters 316 includes filters which may be utilized to change the display of rendered visualizations 314 without modifying the mappings of data fields to visualization characteristics. A specific interface is described above with respect to FIG. 3; however, a variety of user interfaces may be utilized as appropriate to the requirements of specific applications in accordance with embodiments of the invention.

Although a specific process for interest-driven data visualization is described above with respect to FIG. 4, any of a variety of processes may be utilized in accordance with embodiments of the invention. Processes for creating visualizations, selecting data for reports, and exploring data using interest-driven data visualization systems in accordance with embodiments of the invention are discussed further below.

Creating Visualizations in Interest-Driven Data Visualization Systems

Figure 5:
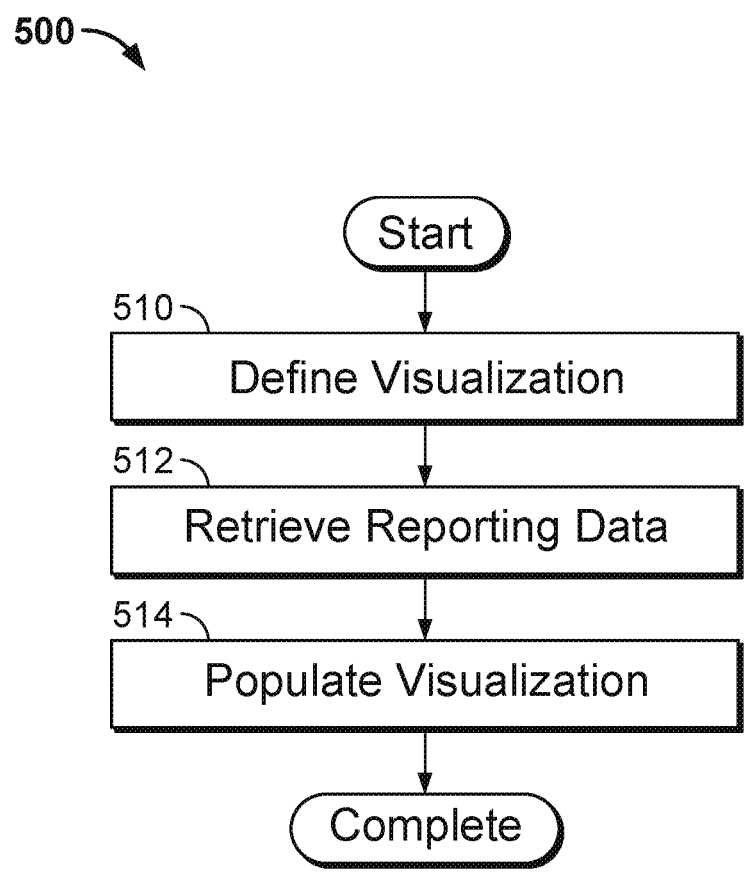
FIG. 5 is a flow chart illustrating a process for creating a visualization using an interest-driven data visualization system in accordance with an embodiment of the invention.

Visualizations, as the name suggests, are the actual viewable representations of reporting data present in an interest-driven data visualization system. Visualizations associate pieces of reporting data in a report with a displayable representation of the reporting data. In this way, visualizations enable the interpretation and exploration of a report by analyzing one or more pieces of reporting data in the report. A process for defining and populating visualizations in accordance with an embodiment of the invention is illustrated in FIG. 5. The process 500 involves defining (510) a visualization. In several embodiments, defining (510) a visualization includes defining filters and/or aggregations on data stored in an interest-driven business intelligence system. In a variety of embodiments, defining filters and/or aggregations causes the interest-driven data visualization system to request additional reporting data from an interest-driven business intelligence system. In many embodiments, defining (510) a visualization involves performing operation on an OLAP cube, such as slicing, dicing, and drilling down. In a variety of embodiments, the OLAP cube is present in the interest-driven data visualization system. In a number of embodiments, the OLAP cube is not present in the interest-driven data visualization system and is generated by an interest-driven business intelligence system. In several embodiments, the interest-driven business intelligence system generates the OLAP cube by dynamically recompiling an interest-driven data pipeline to generate the OLAP cube. Defining (510) visualizations may also involve the creation of and interaction with a variety of data summarizations, such as pivot tables or rollups.

Once the visualization is defined, the reporting data containing the data that supports the visualization is retrieved (512). In a number of embodiments, reporting data may be any number of in-memory data models, such as an OLAP cube, a relational model, or objects stored in the interest-driven data visualization system. Using the reporting data, the visualization is populated (514), enabling the viewing of the data present in the visualization.

Although a specific process for creating visualizations is illustrated in FIG. 5, any of a variety of processes can be utilized to create visualizations using an interest-driven data visualization system in accordance with embodiments of the invention. Processes for exploring data and visualizing information related to reports using interest-driven data visualization systems in accordance with embodiments of the invention are discussed further below.

Figure 6:
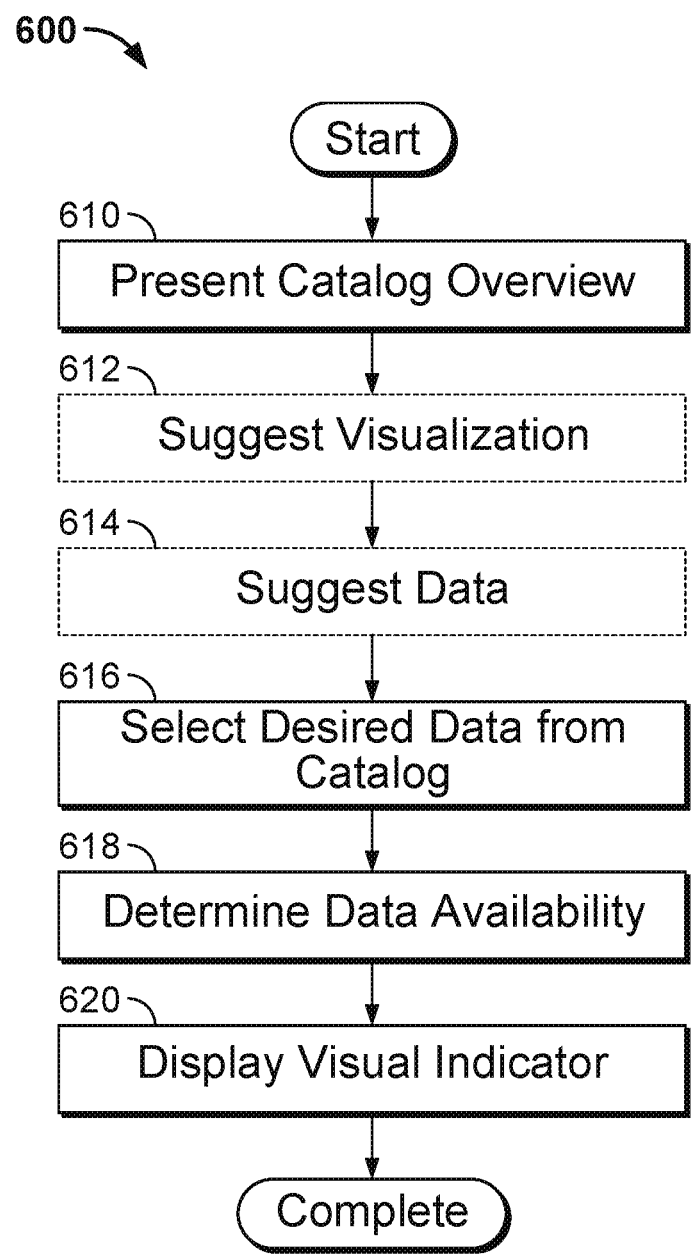
FIG. 6 is a flow chart illustrating a process for estimating time requirements for analyst-generated actions using an interest-driven data visualization system in accordance with an embodiment of the invention.

Visualizing Estimated Execution Time in Interest-Driven Data Visualization Systems Interest-driven data visualization systems dynamically provide analysts with access to a variety of raw data via reporting data and metadata generated by an interest-driven business intelligence system. Interest-driven data visualization systems typically provide a data catalog containing a listing of the data available from the interest-driven business intelligence system. In many cases, the available data is not currently accessible via the reporting data, such as an OLAP cube, provided by the interest-driven business intelligence system that is being used to generate the report that the analyst is currently exploring. In this way, the analyst's exploration of the report is not limited by the reporting data generated by the interest-driven business intelligence system. The interest-driven visualization system can provide instructions to the interest-driven business intelligence system enabling the automatic recompiling of an interest-driven data pipeline to provide the analyst with new reporting data capable of generating new reports and/or visualizations that meet the analyst's data requests. However, the interest-driven business intelligence system providing the reporting data may not be able to provide the data in a low-latency fashion in all cases. A process for estimating the amount of time involved in providing a particular piece of data, set of data, aggregation of data, and/or visualization to an analyst in accordance with an embodiment of the invention is illustrated in FIG. 6. The process 600 involves presenting (610) a catalog overview; the catalog overview includes a listing of data present in the interest-driven business intelligence system. In a number of embodiments, the listing of data includes data present in reporting data contained in the interest-driven data visualization system. In a variety of embodiments, the listing of data includes data derived from metadata describing the raw data and/or aggregate data present on an interest-driven business intelligence system.

In many embodiments, the interest-driven data visualization system suggests (612) visualizations which may be of interest to an analyst. In a number of embodiments, the interest-driven data visualization system suggests (614) data that the analyst may be interested in exploring. The desired data is selected (616) from the catalog. The availability of the data is determined (618) and a visual indicator is displayed (620) indicating the amount of time to retrieve the desired data. The availability of the data can be determined by the interest-driven data visualization system and/or the interest-driven business intelligence system in accordance with embodiments of the invention. In several embodiments, the availability of the data is determined (618) using the metadata describing the data available on the interest-driven business intelligence system and/or the reporting data.

For example, a stoplight system may be utilized to indicate the amount of time to retrieve the desired data: green indicates the data can be accessed quickly, yellow indicates the data may be accessed in a few minutes, and red indicates that accessing the data may not be available from the interest-driven business intelligence system for several hours. A variety of other visual indicators, such as an estimate time, may be utilized as appropriate to the specific requirements of specific embodiments of the invention. In many embodiments, alerts are associated with the availability of the data. As portions of the data become available, an alert is triggered. A variety of alerts can be utilized in accordance with the specific requirements of specific embodiments of the invention, including, but not limited to, pop-up alerts, sound alerts, email alerts, telephone alerts, social media alerts, and small messaging service alerts. For example, if a year worth of records are requested and the first six months of data can be produced in ten minutes and the second six months of data will take a week to be generated, the interest-driven data visualization system can provide the first six months of data and generate reports and visualizations using the first six months of data and an email alert is set. After a week, when the second six months of data becomes available, an email alert is sent notifying interested users that the second six months of data is now available and that reports and visualizations can be created with the full year worth of records.

Although a specific process for estimating data access times using interest-driven data visualization systems is described above with respect to FIG. 6, any of a variety of processes may be utilized in accordance with embodiments of the invention. These processes may be based on a variety of metrics, such as a processing power estimation, instead of the time-based stoplight system described above. Processes for exploring data using interest-drive data visualization systems in accordance with embodiments of the invention are discussed further below.

Data Exploration in Interest-Driven Data Visualization Systems

Figure 7:
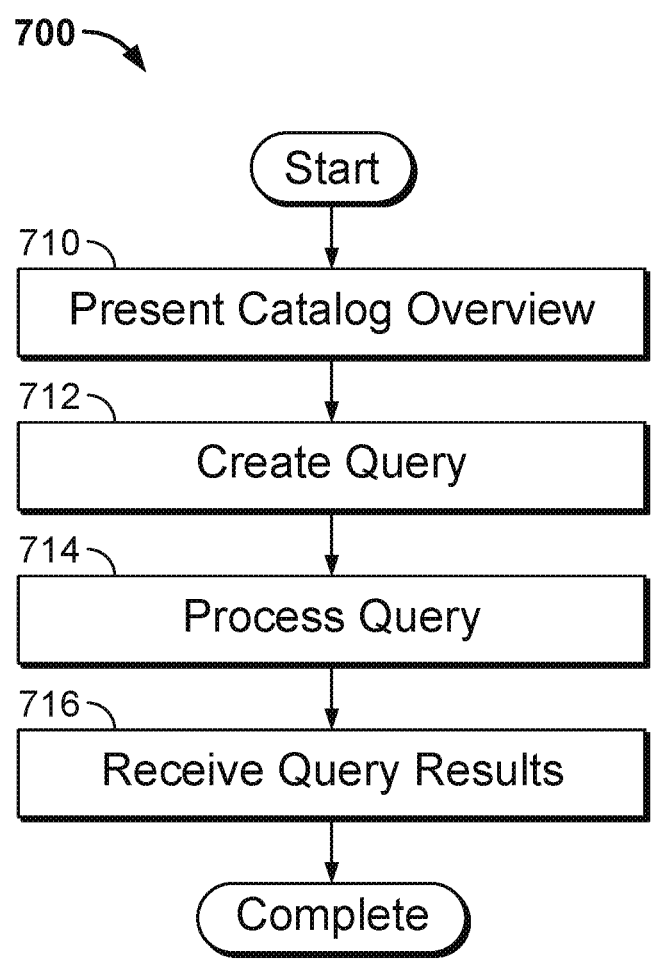
FIG. 7 is a flow chart illustrating a process for data exploration using an interest-driven data visualization system in accordance with an embodiment of the invention.

Interest-driven data visualization systems enable the exploration of raw data contained in interest-driven business intelligence systems and the interaction with that raw data, enabling analysts to find additional reporting data for generating reports. A process for data exploration using an interest-driven data visualization system in accordance with an embodiment of the invention is illustrated in FIG. 7. The process 700 involves presenting (710) a catalog overview; the catalog overview includes a listing of data present in the interest-driven business intelligence system generated using reporting data and metadata describing available raw data provided by the interest-driven business intelligence system. Queries are created (712) utilizing the data present in the catalog overview. The query is processed (714). The results of the query are received (716) by the interest-driven data visualization system.

In many embodiments, the processing (714) of the query is performed utilizing an interest-driven data pipeline, such as, but not limited to, one of the interest-driven data pipelines described in U.S. patent application Ser. No. 13/408,872, incorporated by reference above. In a variety of embodiments, the processed (714) query results in new reporting data being generated using the interest-driven business intelligence system and received (716) by the interest-driven data visualization system. In a number of embodiments, the received (716) reporting data is added as one or more datasets available in the interest-driven data visualization system. In several embodiments, the processed (714) query results include new and/or updated metadata describing the data available on the interest-driven business intelligence system being received by the interest-driven data visualization system. In many embodiments, the received (716) metadata is included in the data catalog, enabling the further exploration of the data available on the interest-driven business intelligence system.

In a number of embodiments, the results of the query are capable of being used by all analysts of the interest-driven data visualization system. This sharing of query results can lead to many interesting features in an interest-driven data visualization system. For example, a collaborative aspect incorporating communication functionality along with sharing query results is provided in many interest-driven data visualization systems in embodiments of the invention. Portable visualizations can be generated and shared among a variety of interest-driven data visualization systems (or among different reports in the same interest-driven data visualization system), where the portable visualizations are mapped to pieces of reporting data in different reports using metadata describing the properties of the pieces of reporting data. In this way, appropriate pieces of reporting data to the visualization can be identified and mapped to the visualization, enabling the same visualization to be re-used across reports and interest-driven data visualization systems. Interest-driven data visualization systems in accordance with many embodiments of the invention include a marketplace where particular queries and custom visualizations can be bought and sold across different businesses utilizing interest-driven data visualization systems. Fields in the visualizations can be mapped to specific pieces of reporting data within an interest-driven business intelligence system associated with the acquiring business using metadata describing the characteristics of the reporting data and matching those characteristics with the fields in the visualization, thereby creating a replacement report where the original reporting data has been replaced with the reporting data associated with the acquiring business.

A specific process for data exploration in interest-driven data visualization systems in accordance with embodiments of the invention is described above with respect to FIG. 7; however, a variety of processes may be utilized in accordance with embodiments of the invention.

Visualization Snapshots

Figure 8:
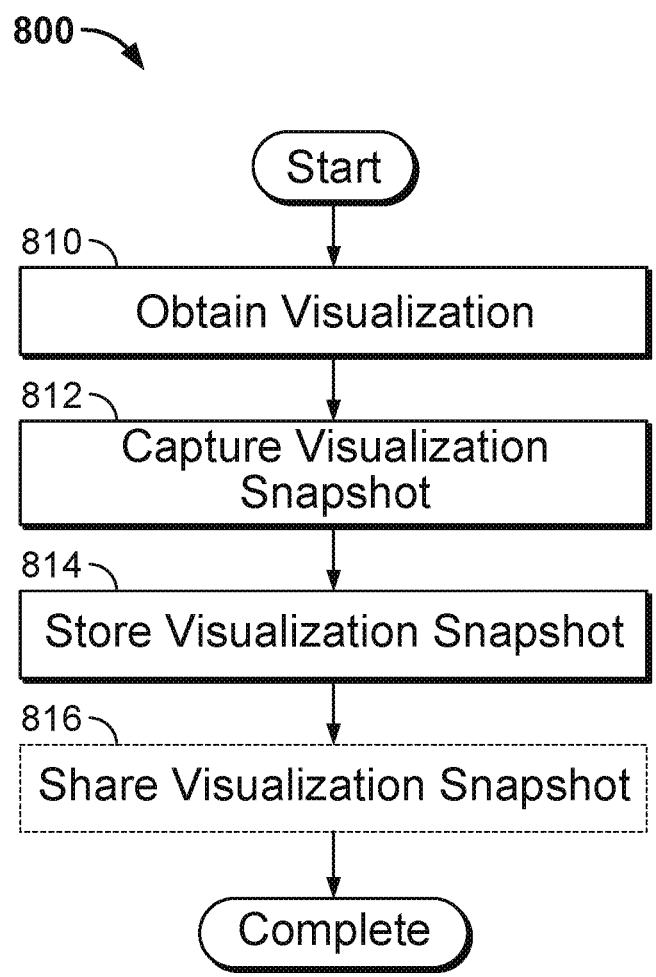
FIG. 8 is a flow chart illustrating a process for creating visualization snapshots using an interest-driven data visualization system in accordance with an embodiment of the invention.

Once a visualization has been created, it can be stored and shared with a variety of sources. The stored visualization can include the reporting data associated with the visualization so that the stored visualization can be displayed on a device that does not have access to an interest-driven business intelligence system from which the reporting data can be retrieved. A process for creating and displaying visualization snapshots in accordance with an embodiment of the invention is shown in FIG. 8. The process 800 includes obtaining (810) a visualization. A visualization snapshot is captured (812). The visualization snapshot is stored (814). In many embodiments, the visualization snapshot is shared (816).

In a variety of embodiments, a visualization is obtained (810) by associating reporting data in a report, where the reporting data includes aggregate data created using unstructured raw data stored in an interest-driven business intelligence system. A variety of processes for creating visualizations that can be obtained (810) in accordance with embodiments of the invention are discussed above. In a number of embodiments, capturing (812) a snapshot visualization includes capturing the properties of the obtained (810) visualization along with a portion of the reporting data associated with the obtained (810) visualization. In several embodiments, the entire report (and/or additional data) is included with the captured (812) visualization snapshot. In a number of embodiments, the visualization snapshot can be stored (814) using the interest-driven data visualization system and/or a remote system separate from the interest-driven data visualization system. In a variety of embodiments, sharing (816) the visualization snapshot includes transmitting the visualization snapshot to a remote system separate from the interest-driven data visualization system. In many embodiments, the remote system is configured to display the visualization snapshot using the reporting data contained within the visualization snapshot. In several embodiments, the remote system is configured to communicate with an interest-drive business intelligence system to request updated data based on the reporting data stored in the visualization snapshot.

Processes for creating and sharing visualization snapshots in accordance with embodiments of the invention are discussed above with respect to FIG. 8; however, a variety of processes may be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An interest-driven data visualization system, comprising:
 a processor;
 a memory connected to the processor and configured to store an interest-driven data visualization application; and
 metadata storage configured to store data description metadata describing raw data;
 wherein the interest-driven data visualization application configures the processor to:
  define reporting data requirements, where the reporting data requirements comprise at least one piece of reporting data metadata;
  generate data retrieval job data based on the at least one piece of reporting data metadata in the reporting data requirements and the data description metadata;
  transmit the data retrieval job data to an interest-driven business intelligence system;
  receive aggregate data from the interest-driven business intelligence system, where the interest-driven business intelligence system is configured to:
   process data retrieval job data to generate aggregate data using the raw data, where a portion of the raw data is unstructured data; and
   store aggregate data and the raw data described by the data description metadata stored within a metadata storage device of the interest-driven data visualization system;
  create at least one piece of reporting data using the received aggregate data, the data description metadata, and the reporting data metadata;
  associate visualization metadata with the reporting data, where the visualization metadata describes a visual appearance of the at least one piece of reporting data; and
  generate a report using the at least one piece of reporting data, the reporting data requirements, and the visualization metadata, where the generated report is configured to be displayed using a display device;
  determine data description metadata using a second interest-driven business intelligence system, where the second interest-driven business intelligence system is separate from the interest-driven business intelligence system and the data description metadata describes new aggregate data available via the second interest-driven business intelligence system;
  create replacement reporting data using the data description metadata;
  determine a mapping between a portion of the replacement reporting data and the visualization metadata based on the reporting data requirements and the data description metadata, comprising to:
   map a first field in the visualization metadata to a first piece of the replacement reporting data;
   map a second field in the visualization metadata to a second piece of the replacement reporting data, the first field being different from the second field; and
   generate the mapping between the portion of the replacement reporting data and the visualization metadata based on the first field and the second field; and
  generate a replacement report using the mapping between the portion of the replacement reporting data and the visualization metadata.

2. The system of claim 1, wherein the interest-driven data visualization application configures the processor to receive aggregate data metadata from the interest-driven business intelligence system, where the aggregate data metadata includes time estimation data describing a delay associated with generating supplemental aggregate data using the raw data that is generated based on time taken to generate at least a portion of the aggregated data.

3. The system of claim 2, wherein the interest-driven data visualization application configures the processor to include display report metadata in the generated report, where the display report metadata configures the report to include an indication of the delay associated with generating the supplemental aggregate data.

4. The system of claim 2, wherein the interest-driven data visualization application configures the processor to:
 generate supplemental data retrieval job data based on the data retrieval job data and the received aggregate data;
 transmit the supplemental data retrieval job data to the interest-driven business intelligence system;
 receive supplemental aggregate data from the interest-driven business intelligence system;
 update at least one piece of the at least one piece of reporting data using the supplemental aggregate data, the data description metadata, and the reporting data metadata; and
 update the report using the updated at least one piece of the at least one piece of reporting data.

5. The system of claim 4, wherein the interest-driven data visualization application configures the processor to:
 associate an alert with the supplemental data retrieval job data, where the alert comprises an action to be performed; and
 perform the action associated with the alert when the supplemental aggregate data is received.

6. The system of claim 1, wherein the interest-driven data visualization application configures the processor to:
 capture a visualization snapshot using the generated report, where the visualization snapshot includes a portion of the reporting data, the reporting data requirements, and display data metadata; and
 store the visualization snapshot within the memory.

7. The system of claim 6, wherein the interest-driven data visualization application configures the processor to transmit the visualization snapshot to a remote system separate from the interest-driven data visualization system, where the remote system is configured to display the visualization snapshot without communicating with the interest-driven business intelligence system.

8. The system of claim 1, wherein the visualization metadata comprises a portable visualization.

9. The system of claim 1, wherein the visualization metadata is automatically generated based upon the reporting data and the reporting data requirements.

10. A method for creating interest-driven data visualizations, comprising:

defining reporting data requirements using an interest-driven data visualization system, where the reporting data requirements comprise at least one piece of reporting data metadata;

generating data retrieval job data based on the at least one piece of reporting data metadata in the reporting data requirements and data description metadata using the interest-driven data visualization system;

transmitting the data retrieval job data to an interest-driven business intelligence system using the interest-driven data visualization system;

receiving aggregate data from the interest-driven business intelligence system using the interest-driven data visualization system, where the interest-driven business intelligence system is configured to:
  process data retrieval job data to generate aggregate data using raw data, where a portion of the raw data is unstructured data; and
  store aggregate data and the raw data described by the data description metadata stored within a metadata storage device of the interest-driven data visualization system;

creating at least one piece of reporting data based on the received aggregate data, the data description metadata, and the reporting data metadata using the interest-driven data visualization system;

associating visualization metadata with the reporting data using the interest-driven data visualization system, where the visualization metadata describes a visual appearance of the at least one piece of reporting data;

generating a report based on the at least one piece of reporting data, the reporting data requirements, and the visualization metadata using the interest-driven data visualization system;

determining data description metadata using a second interest-driven business intelligence system, where the second interest-driven business intelligence system is separate from the interest-driven business intelligence system and the data description metadata describes new aggregate data available via the second interest-driven business intelligence system;

creating replacement reporting data using the data description metadata;

determining a mapping between a portion of the replacement reporting data and the visualization metadata based on the reporting data requirements and the data description metadata, comprising:
  mapping a first field in the visualization metadata to a first piece of the replacement reporting data;
  mapping a second field in the visualization metadata to a second piece of the replacement reporting data, the first field being different from the second field; and
  generating the mapping between the portion of the replacement reporting data and the visualization metadata based on the first field and the second field; and generating a replacement report using the mapping between the portion of the replacement reporting data and the visualization metadata.

11. The method of claim 10, further comprising receiving aggregate data metadata from the interest-driven business intelligence system using the interest-driven data visualization system, where the aggregate data metadata includes time estimation data describing a delay associated with generating supplemental aggregate data using the raw data that is generated based on time taken to generate at least a portion of the aggregated data.

12. The method of claim 11, further comprising displaying report metadata in the generated report using the interest-driven data visualization system, where the display report metadata configures the report to include an indication of the delay associated with generating the supplemental aggregate data.

13. The method of claim 11, further comprising:
generating supplemental data retrieval job data based on the data retrieval job data and the received aggregate data using the interest-driven data visualization system;
transmitting the supplemental data retrieval job data to the interest-driven business intelligence system using the interest-driven data visualization system;
receiving supplemental aggregate data from the interest-driven business intelligence system using the interest-driven data visualization system;
updating at least one piece of the at least one piece of reporting data based on the supplemental aggregate data, the data description metadata, and the reporting data metadata using the interest-driven data visualization system; and
updating the report based on the updated reporting data using the interest-driven data visualization system.

14. The method of claim 13, further comprising:
associating an alert with the supplemental data retrieval job data using the interest-driven data visualization system, where the alert comprises an action to be performed; and
performing the action associated with the alert using the interest-driven data visualization system when the supplemental aggregate data is received.

15. The method of claim 10, furthering comprising:
capturing a visualization snapshot based the generated report using the interest-driven data visualization system, where the visualization snapshot includes a portion of the reporting data, the reporting data requirements, and display data metadata; and
storing the visualization snapshot using the interest-driven data visualization system.

16. The method of claim 15, further comprising transmitting the visualization snapshot to a remote system separate from the interest-driven data visualization system using the interest-driven data visualization system, where the remote system is configured to display the visualization snapshot without communicating with the interest-driven business intelligence system.

17. The method of claim 10, wherein the visualization metadata comprises a portable visualization.

18. The method of claim 10, wherein the visualization metadata is automatically generated based upon the reporting data and the reporting data requirements using the interest-driven data visualization system.

* * * * *